Nov. 21, 1967  J. E. WISER ETAL  3,353,426
SPEED REDUCTION SYSTEM FOR A TIMER
Filed Oct. 28, 1965  2 Sheets-Sheet 1
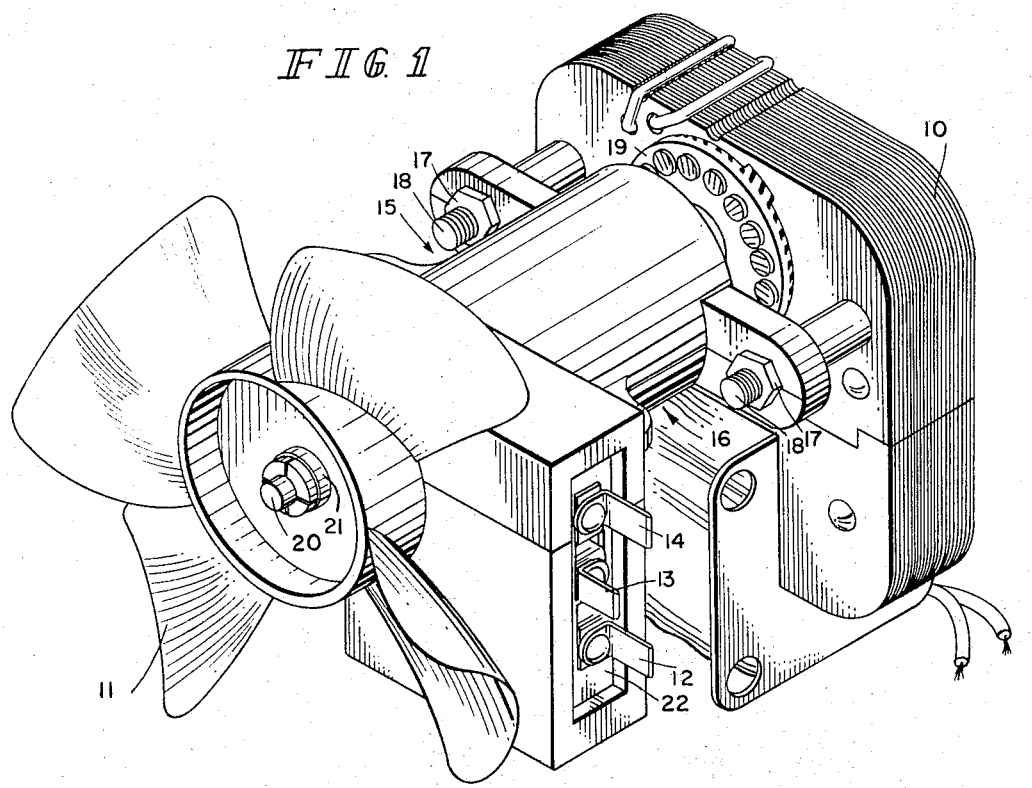
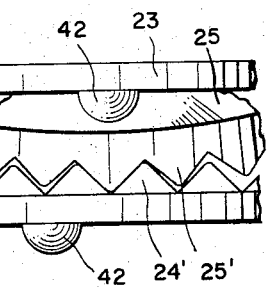
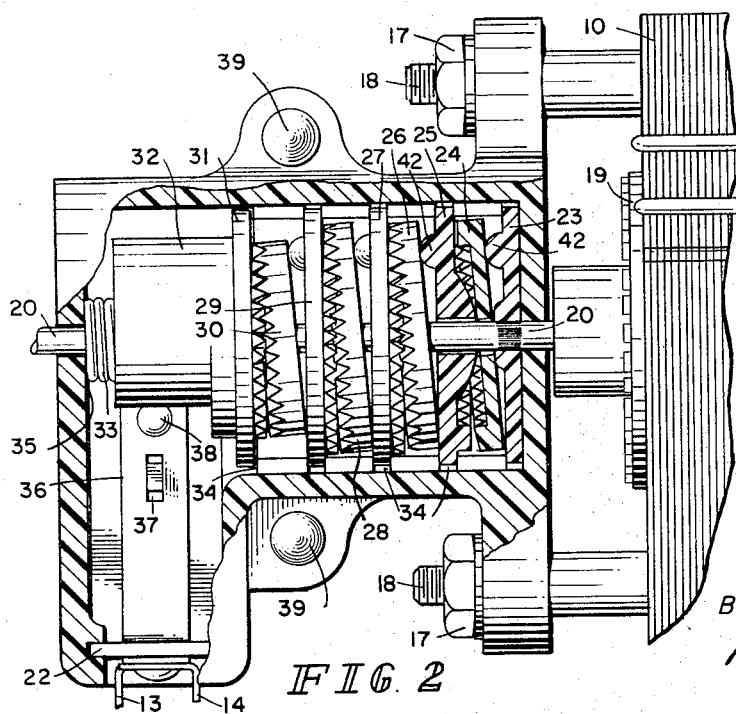
INVENTORS
JOSEPH E. WISER
ELMO W. VOLAND
BY
Robert Cunmi
ATTORNEY

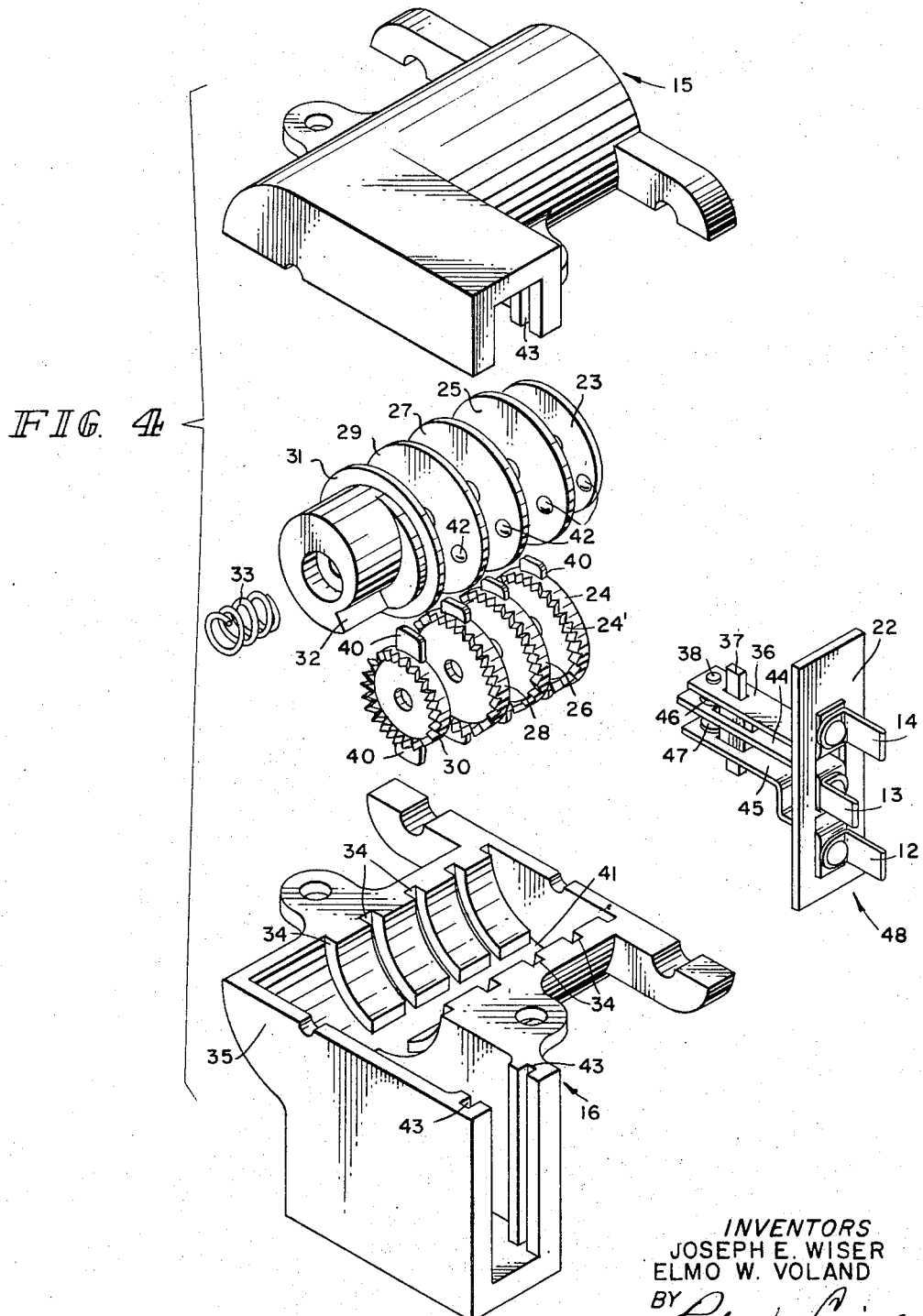

United States Patent Office 3,353,426
Patented Nov. 21, 1967

3,353,426
SPEED REDUCTION SYSTEM FOR A TIMER
Joseph E. Wiser and Elmo W. Voland, Indianapolis, Ind., assignors to P. R. Mallory & Co., Inc., Indianapolis, Ind., a corporation of Delaware
Filed Oct. 28, 1965, Ser. No. 505,570
16 Claims. (Cl. 74—800)

ABSTRACT OF THE DISCLOSURE

A motor drives a series of wobble gears to operate a timing cam. The motor drives the first wobble gear by a rotating gear; succeeding wobble gears are driven by a protrusion on an adjacent rotating gear. All gears are mounted freely on a shaft and are held axially in engagement with each other. The wobble gears are prevented from rotating by tangs riding in grooves in a housing for the speed reduction system.

---

The present invention relates to speed reduction systems for timers and more particularly to the means and method for providing an improved wobble drive system for obtaining very great speed reduction with a minimum of moving parts.

Many appliances are used today which have high speed motors which run continually and a separate motor which operates a timer or clock mechanism for energizing an element of the appliance after a predetermined period of time. For example, a defroster system in modern refrigerators has a motor which drives a fan as long as the refrigerator is operating and a separate motor driven for energizing heating elements and de-energizing the compressor of the refrigerator once or twice a day.

There is presented herein a speed reduction system that can be used in conjunction with a high speed motor to eliminate the need for a separate motor to operate a timer. In the defroster application mentioned above, the high speed motor which drives the fan will also operate the speed reduction system which is an integral part of a timer which energizes the heating elements.

The speed reduction system of the present invention utilizes a plurality of wobble gears and driven gears to obtain the necessary rotational output. In the illustrative embodiment of this specification, a high speed motor drives a shaft which extends through the centers of the wobble gears and driven gears but does not impart rotation to said wobble gears or driven gears. The first wobble gear is caused to wobble by a member which is rotated by said shaft, thereby causing the driven gear which is engaged with said first wobble gear to be rotated. Each driven gear has a substantially hemispherical protrusion thereon for wobbling the adjacent wobble gear.

It is an object of the present invention, therefore, to provide a novel speed reduction system that is capable of achieving great speed reductions with a minimum of moving parts.

It is another object of the present invention to provide an improved speed reduction system utilizing a plurality of separated wobble gears and a driven gear engaged with each of said wobble gears.

It is another object of the present invention to provide a wobble gear speed reduction system for a timer application.

It is an other object of the present invention to provide a defroster system wherein the fan motor also operates a speed reduction system for a timer which periodically energizes heating elements of said defroster.

It is another object of the present invention to provide a speed reduction system which is contained in a hollow cylindrical housing which has grooves therein for rotatably supporting driven gears of said speed reduction system.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIGURE 1 is a perspective view of a defroster blower assembly utilizing the timer of the present invention.

FIGURE 2 is a fragmentary perspective view of the wobble gear drive assembly portion of the defroster mechanism.

FIGURE 3 is a fragmentary view showing how the teeth of the wobble gears engage the teeth of the driven gears.

FIGURE 4 is an exploded perspective view of the wobble gear drive assembly of the present invention.

Generally speaking, the present invention is a speed reduction system comprising: a driven shaft; a means on said shaft for wobbling a first of a plurality of wobble gears freely mounted about said shaft; said wobble gears having axially extending teeth about a periphery thereof; a means for preventing rotation of said wobble gears; a driven gear engaged with each of said wobble gears so as to be rotated when said wobble gears are wobbled, said driven gears having a different number of teeth than said wobble gears so as to provide a speed reduction for each driven gear; a means on said driven gear for wobbling an adjacent wobble gear as said driven gears are rotated; and a means for holding said wobble gears and said driven gears in engagement.

In a timer application, the present invention is a means for energizing an element of an appliance after a predetermined time comprising: a driving means having a shaft rotating at a substantially constant speed; a means rotated by said shaft for wobbling a first of a plurality of wobble gears; said gears having axially extending teeth about a periphery thereof, said wobble gears being freely mounted about said shaft; a means for preventing rotation of said wobble gears; a driven gear engaged with each of said wobble gears so as to be rotated thereby as said wobble gears are wobbled, said driven gears having a different number of teeth than said wobble gears so as to provide a predetermined speed reduction for each driven gear; a means on said driven gears for wobbling an adjacent wobble gear as said driven gears are rotated; a cam means for operating electrical switches, said cam means being connected to and rotated by a driven gear having a predetermined rotational speed; and a means for holding said wobble gears and said driven gears in engagement.

Referring now to the drawing, and particularly to the perspective view of FIGURE 1, the component parts of the present invention can be visualized in conjunction with the following description. The motor 10 is the driving means for the fan 11 and the wobble gear drive assembly contained in the cylindrical housing formed by the top portion 15 and the bottom portion 16. The housing top portion 15 and bottom portion 16 are affixed to the motor 10 by means of the nuts 17 and studs 18. There is a switch enclosure formed by the top portion 15, the bottom portion 16 and the terminal board 22. Terminals 12, 13 and 14 of the switch are affixed to the terminal board 22. The fan 11 is mounted on the shaft 20 by the retaining means 21 so as to be rotated by the motor 10.

Referring now to FIGURE 2, a sectional view of the defroster system showing the wobble gear drive assembly consisting of the driving member 23 affixed to the shaft 20, the fixed wobble gears 24, 26, 28 and 30 and the driven gears 25, 27, 29 and 31 can be seen. The fixed wobble gears 24, 26, 28 and 30 and the driven gears 25, 27, 29 and 31 are rotatably mounted on the shaft 20. That is, the gears 24 through 31 can turn free of the shaft. There is a cam means 32 integrally affixed to the driven gear 31 so as to be rotated thereby. There is a spring means 33 mounted on the shaft 20 between the housing wall 35 and the cam means 32 for holding the fixed wobble gears 24, 26, 28 and 30 and the driven gears 25, 27, 29 and 31 in engagement. The cam means 32 operates the switching means for providing an electrical output for the timer of the defroster system. The contact member 36, connecting member 37, and the contact 38 are shown in FIGURE 2. The rivets 39 secure the top portion 15 of the housing to the bottom portion 16 of the housing. The driven gears 25, 27, 29 and 31 are permitted to rotate within the grooves 34 about the interior walls of the housing. The grooves 34 also tend to keep the wobble gears and driven gears engaged. It can be seen in FIGURE 2 that the opening formed by the top portion 15 and bottom portion 16 of the housing is a substantially cylindrical opening. The driven gear 25 is shown in section to illustrate the curved portion (spherical portion) on the back which provides a fulcrum for the wobble gear 24. Each driven gear has such a curved portion.

Referring now to FIGURE 3 a fragmentary view showing how the teeth 25′ on the fixed wobble gear 25 engages the teeth 24′ on the driven gear 24 can be seen. The teeth directly under the protrusion 42 are engaged.

Referring now to FIGURE 4, the details of the wobble gear assembly can be visualized. The top portion 15 of the housing and the bottom portion 16 of the housing encloses the fixed wobble gears 24, 26, 28 and 30, the driven gears 25, 27, 29 and 31, the first driving member 23, the cam 32, the coil spring 33, and the switch assembly 48. The tangs 40 on the fixed wobble gears 24, 26, 28 and 30 extend into the track 41 formed in the bottom portion 16 of the housing to prevent rotation of said fixed wobble gears. The tangs 40 are one means for restraining the wobble gears from rotating. Obviously, other means could be devised within the scope of the present invention.

The first driving member 23 and the driven gears 25, 27 and 29 have a substantially hemispherical protrusion 42 for engaging the back of the adjacent wobble gear. The protrusion 42 is a means for wobbling an adjacent wobble gear as the driving member 23 or the driven gears 25, 27, and 29 are rotated. The terminal board 22 fits into the groove 43 in the top portion 15 and bottom portion 16 of the housing.

The switch assembly 48 consists of three contact members 36, 44 and 45, their associated terminals 12, 13 and 14, the terminal board 22, the contacts 38, 46 and 47, and the connecting member 37. The connecting member 37 is a means for preventing more than two of the contacts 38, 46 and 47 from being in contact at any one time.

With the above description of components in mind, and by making reference to the drawing figures, the following analysis of operation will serve to convey the functional details of the present invention. As stated previously, the present invention is a timer for operating an element of an appliance after a predetermined period of time. The illustrative embodiment of this specification is a defroster system wherein a timer is operated by a continually running fan motor to energize a heating element twice a day. The heated air provided by the fan 11 and the heating element will defrost the refrigerator containing the defroster.

Referring again to FIGURE 1, it can be seen that the fan 11 is on a shaft 20 which is continually driven by the high speed motor 10. A speed which has been found satisfactory for the motor 10 is approximately 3000 revolutions per minute.

Referring again to FIGURE 2, the operation of the wobble gear assembly can be discussed. The first driving member 23 is mounted on the shaft 20 so as to be rotated at the speed of the motor 10. The fixed wobble gears 24, 26, 28 and 30 and the driven gears 25, 27, 29 and 31 are free to rotate on the shaft 20. As the first driving member 23 is rotated at the speed of the motor 10, the hemispherical protrusion 42 on said first driving member causes the fixed wobble gear 24 to wobble against the driven gear 25. As the fixed wobble gear 24 wobbles, the teeth of said fixed wobble gear engages the teeth of the driven gear 25 at an angular segment just under the protrusion 42. Since the fixed wobble gear 24 has 39 teeth and the driven gear 25 has 40 teeth, the first driving member 23 has to be rotated 40 times in order for the driven gear 25 to be advanced one revolution. As the drive gear 25 rotates, the protrusion on said driven gear 25 causes the fixed wobble gear 26 to wobble, and therefore, to engage the driven gear 27. Again there is a 40 to 1 speed reduction. (The fixed wobble gear 26 has 39 teeth and the driven gear 27 has 40 teeth.) The reduction of speed continuous through the fixed wobble gear 28, the driven gear 29, the fixed wobble gear 30, and the driven gear 31. The fixed wobble gear 28 and the driven gear 29 provides a 40 to 1 speed reduction and the fixed wobble gear 30 and the driven gear 31 provides a 33 to 1 speed reduction. There are, therefore, three 40 to 1 speed reductions and one 33 to 1 speed reduction for a total speed reduction of 2,112,000 to 1 in the illustrative embodiment of FIGURE 2. If the motor turns at 3000 revolutions per minute, the cam 32 will be rotated through a complete revolution approximately two times per day. Referring again in FIGURE 4, it can be seen that the cam 32 deflects the contact members 36, 44 and 45 of the switch assembly 48 gradually as the cam 32 rotates. At an established angular position of the cam 32 the contact member 36 is released by the drop-off portion of the cam 32, thereby opening the contacts 38 and 46. As the cam 32 rotates further the contact member 44 is released by the drop-off portion to open the contacts 46 and 47 and to close the contacts 38 and 46. Finally the contact member 45 is released by the drop-off portion of the cam 32 to open the contacts 46 and 47 and to close the contacts 38 and 46.

The speed reduction of a wobble gear design as disclosed in this specification is the result of the rotation imposed on the driven gears 25, 27, 29 and 31 by the wobble or nutation of the fixed wobble gears 24, 26, 28 and 30. The nutation of the fixed wobble gears 24, 26, 28 and 30 is caused by the movement of the hemispherical protrusions on the first driving member 23 and the driven gears 25, 27 and 29 against the back of said wobble gears.

The number of teeth of the fixed wobble gears must be more or less than the number of teeth of the mating driven gear. Typically, there is a difference of one tooth between a wobble gear and a driven gear. If the driving source of the fixed wobble gear is clockwise and the number of teeth of the fixed wobble gear is less than the number of teeth of the driven gear, the rotation of the driven gear will be clockwise. If the number of teeth of the fixed wobble gear is more than the number of teeth of the driven gear, the direction of rotation of the driven gear will be opposite to that of the fixed wobble gear. Obviously, if the number of teeth on the fixed wobble gear is the same as the number of teeth on the driven gear, the driven gear will not be rotated by the fixed wobble gear.

Wobble gear drives such as the one shown in the illustrative embodiment of this specification can be used for many timing functions where a long period of time is required. For instance, a timer could be made with five or six pairs of wobble gears that would operate a water softener regeneration system every two or theree days. Other speed reduction applications may be derived using the wobble gear assembly of the present invention.

The advantages of a wobble gear speed reduction system such as disclosed in this specification is that a tremendous speed reduction can be obtained with a minimum of moving parts. Also, the high speed shaft that is the driving force for the wobble gear drive and that extends through the center of the gear can be used to drive an element such as a fan.

The speed reduction system of the present invention, as hereinbefore described in one of its embodiments, is merely illustrative and not exhaustive in scope. Since many widely different embodiments may be made without departing from the scope thereof, it is intended that all matter contained in the above description and shown in the accompanying drawing shall be interposed as illustrative and not in a limiting sense.

What is claimed is:

1. A speed reduction system comprising: a plurality of wobble gears freely mounted about a shaft; a means engaged with a first of said wobble gears for imparting a wobbling motion thereto; a means for restraining said wobble gears from rotating about said shaft; a driven gear engaged with each of said wobble gears so as to be rotated about said shaft when said wobble gears are wobbled, said driven gears having a means thereon for wobbling an adjacent wobble gear as said driven gears are rotated; a peripheral means for rotatably supporting said driven gears; and a means for holding said wobble gears and said driven gears in engagement.

2. A speed reduction system as in claim 1 wherein said wobble gears and said driven gears have axially extending teeth.

3. A speed reduction system as in claim 1 wherein said wobble gears and said driven gears have a different number of teeth so as to provide a speed reduction for each driven gear.

4. A speed reduction system as in claim 1 wherein said shaft is a driven shaft and said means for wobbling a first of said wobble gears is mounted on said shaft.

5. A speed reduction system as in claim 1 wherein a means is engaged with and driven by one of said driven gears for providing a rotary output for said speed reduction system.

6. A speed reduction system as in claim 1 wherein said means for wobbling said first wobble gear is a disc shaped member having a substantially hemispherical protrusion engaged with said first wobble gear, said disc shaped member being mounted on said shaft so as to be rotated thereby.

7. A speed reduction system as in claim 1 wherein said driven gears have a substantially hemispherical protrusion thereon for wobbling an adjacent wobble gear as said driven gears are rotated.

8. A means for energizing an element of an appliance after a predetermined time comprising: a driving means having a shaft rotating at a substantially constant speed; a means rotated by said shaft for wobbling a first of a plurality of wobble gears; said gears having axially extending teeth about a periphery thereof, said wobble gears being freely mounted about said shaft; a means for preventing rotation of said wobble gears; a driven gear engaged with each of said wobble gears so as to be rotated thereby as said wobble gears are wobbled, said driven gears having a different number of teeth than said wobble gears so as to provide a predetermined speed reduction for each driven gear; a means on said driven gears for wobbling an adjacent wobble gear as said driven gears are rotated; a peripheral means for rotatably supporting said driven gears; a cam means for operating electrical switches, said cam means being connected to and rotated by a driven gear having a desired rotational speed; and a means for holding said wobble gears and said driven gears in engagement.

9. A timer for periodically energizing heating elements in a defroster system of the type having a fan driven by a relatively high speed motor comprising: a housing having a hollow cylindrical opening extending therethrough; a shaft axially journalled in said hollow cylindrical opening, said shaft being coupled to and driven by said motor; a driving member having a means thereon for wobbling a first of a plurality of wobble gears, said driving member being mounted on said shaft so as to be rotated thereby; said wobble gears having axially extending teeth about the periphery thereof, said wobble gears being freely mounted about said shaft; a means within said housing for restraining said wobble gears from rotating; a driven gear engaged with each of said wobble gears and mounted within said hollow cylindrical opening so as to rotate freely with respect to said shaft, said driven gears having a different number of teeth than said wobble gears so as to be rotated when said wobble gears are wobbled; a means on each of said driven gears for wobbling an adjacent wobble gear as said driven gears are rotated; a cam means for operating electrical switches connected to said heating element, said cam means being connected to and rotated by a driven gear having a predetermined rotational speed; and a means for holding said wobble gears and said driven gears in engagement.

10. A speed reduction system comprising: a plurality of wobble gears freely mounted about a shaft; a means engaged with a first of said wobble gears for imparting a wobbling motion thereto; a means for restraining said wobble gears from rotating about said shaft; a driven gear engaged with each of said wobble gears so as to be rotated about said shaft when said wobble gears are wobbled, said driven gears having a means thereon for wobbling an adjacent wobble gear as said driven gears are rotated; a means for holding said wobble gears and said driven gears in engagement; and a hollow cylindrical housing enclosing said wobble gears and said driven gears, said housing having an interior wall provided with grooves for rotatably supporting said driven gears.

11. A speed reduction system as in claim 10 wherein said wobble gears and said driven gears have axially extending teeth.

12. A speed reduction system as in claim 10 wherein said shaft is a driven shaft and said means for wobbling a first of said wobble gears is mounted on said shaft.

13. A speed reduction system as in claim 10 wherein a means is engaged with and driven by one of said driven gears for providing a rotary output for said speed reduction system.

14. A speed reduction system as in claim 10 wherein said means for wobbling said first wobble gear is a disc-shaped member having a substantially hemispherical protrusion engaged with said first wobble gear, said disc-shaped member being mounted on said shaft so as to be rotated thereby.

15. A speed reduction system as in claim 10 wherein said driven gears have a substantially hemispherical protrusion thereon for wobbling an adjacent wobble gear as said driven gears are rotated.

16. A means for controlling an element of an appliance comprising: a hollow cylindrical housing having an interior wall provided with a plurality of grooves therearound; a shaft axially journalled in said housing, said shaft being coupled to and driven by a motor; a driving member having a means thereon for wobbling a first of a plurality of wobble gears freely mounted about said shaft, said driving member being mounted on said shaft so as to be rotated thereby; a means within said housing for restraining said wobble gears from rotating; a driven gear engaged with each of said wobble gears and rotatably supported by said grooves so as to rotate freely with respect to said shaft, said driven gears being rotated when said wobble gears are wobbled; said wobble gears and said driven gears being enclosed within said housing; a means on each of said driven gears for wobbling an adjacent wobble gear as said driven gears are rotated; a cam means for operating an electrical switch connected to said appliance element, said cam means being coupled to and rotated by a driven gear having a predetermined rotational speed; and a means for holding said wobble gears and said driven gears in engagement.

References Cited

UNITED STATES PATENTS

| | | | |
|---|---|---|---|
| 1,611,981 | 12/1926 | Amberg | 74—800 |
| 2,548,324 | 4/1951 | Smith | 62—157 X |
| 2,590,499 | 3/1952 | Braswell | 62—157 X |
| 2,725,723 | 12/1955 | Hilliker | 62—154 X |
| 2,741,097 | 4/1956 | Miles | 62—154 X |
| 2,953,944 | 9/1960 | Sundt | 74—800 X |
| 3,129,382 | 4/1964 | Scott | 74—804 X |
| 3,129,611 | 4/1964 | Lee | 74—804 |
| 3,139,771 | 7/1964 | Maroth | 74—800 |
| 3,258,994 | 7/1966 | Gorfin | 74—800 |

FOREIGN PATENTS 139,327   10/1948   Australia.

ROBERT A. O'LEARY, *Primary Examiner.*

DONLEY J. STOCKING, *Examiner.*

L. H. GERIN, *Assistant Examiner.*